J. GUNNING & J. HANSFORD.
GAS METER OR THE LIKE APPARTUS.
APPLICATION FILED JULY 8, 1907.

919,162.

Patented Apr. 20, 1909.

Witnesses:

Inventors
John Gunning
John Hansford
By
James L. Norris.
Atty

UNITED STATES PATENT OFFICE.

JOHN GUNNING, OF BOURNEMOUTH, AND JOHN HANSFORD, OF PORTLAND, ENGLAND, ASSIGNORS TO WILLIAM PIKE GIBBONS, OF RUITON HOUSE, NEAR DUDLEY, ENGLAND.

GAS-METER OR THE LIKE APPARATUS.

No. 919,162.    Specification of Letters Patent.    Patented April 20, 1909.

Application filed July 8, 1907. Serial No. 362,813.

*To all whom it may concern:*

Be it known that we, JOHN GUNNING and JOHN HANSFORD, both subjects of the King of Great Britain, residing, respectively, at 100 Holdenhurst road, Bournemouth, in the county of Hants, England, gas-engineer, and The Gas Works, Portland, in the county of Dorset, England, gas-engineer, have invented certain new and useful Improvements in Gas-Meters or the Like Apparatus, of which the following is a specification.

This invention relates to gas meters or other similar apparatus, and more particularly to indicating and recording devices of such apparatus, in which the consumption of gas, or whatever the meter is intended to register, as well as the value thereof, is indicated on a strip of paper or the like bearing a suitably displayed scale of quantities and corresponding values, which is caused to move past an inspection window in the meter frame or other suitable index.

According to the present invention, the recording apparatus is entirely inclosed within the meter casing, and on the paper strip, the quantity of gas consumed with its value since the insertion of the strip, is marked by a spring actuated punch, or any other suitable marking device, the said punch being preferably operated by the opening of the casing to obtain access to the record strip or to the coin till when the meter is used in conjunction with a prepayment device.

By inserting duplicate strips both of which are punched or marked simultaneously, the consumer, as well as the supplier, may obtain a record of the consumption charged for, and the supplier's record may be marked at the same time by a number or other indication identifying the meter from which the record has been taken.

The invention also includes means for cutting off the supply when the quantity corresponding to the length of strip inserted has been exhausted, and this may be done in the case of gas supply either by simply stopping the meter mechanism or by transmitting the tensional stress on the paper through suitable mechanism to actuate a valve or other cut-off.

The recording apparatus, which may itself be considered as constituting a prepayment device for a meter, may also be combined with any suitable form of ordinary prepayment mechanism, as for example the improved form of such apparatus which is shown in the accompanying drawings, in which—

Figure 1:
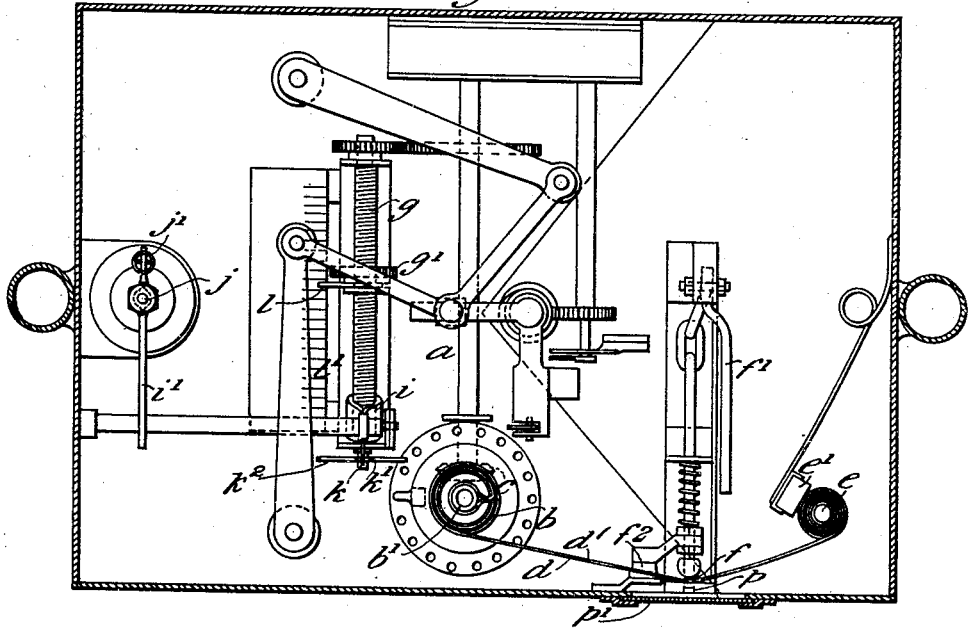
Figure 2:
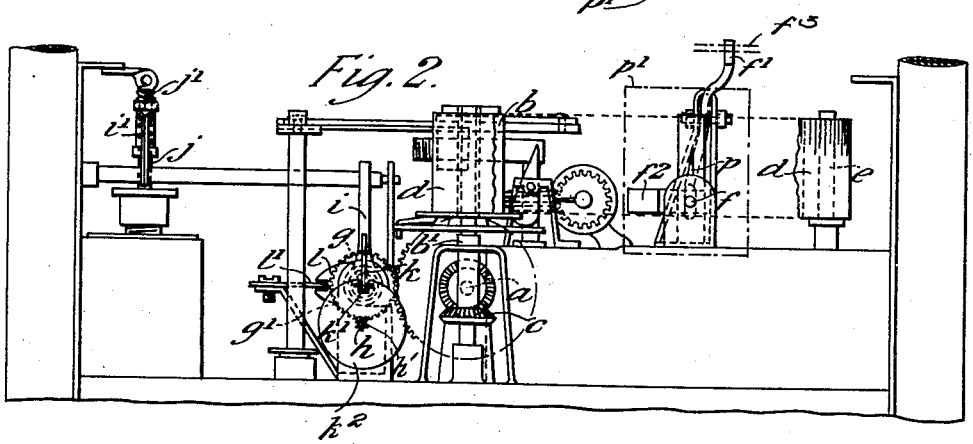
Figure 3:
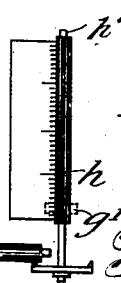

Figure 1 is a plan view and Fig. 2 an elevation of apparatus embodying the present invention as applied to a gas meter; and Fig. 3 represents coin freed mechanism for actuating the meter setting mechanism.

The shaft $a$ is driven through any suitable reducing gear from the ordinary meter mechanism, and drives the spindle $b'$ of a drum $b$ through bevel gear $c$. The tape or strip of paper $d$ bearing a scale of quantities with or without a corresponding scale of values is wound on the drum $b$ and off the parallel spindle or drum $e$ as the shaft $a$ is revolved, the tape speed being of course proportional to the rate of consumption of the gas. A friction brake $e'$ or equivalent device may be applied to the tape $d$ or spindle $e$ to keep the tape taut. The tape passes in front of a spring urged punch $f$ which is normally retracted by the displacement of a bell crank lever $f'$ or equivalent device engaging a slot in the lid or door which gives access to the apparatus as indicated in part at $f^3$, and the opening of which releases the punch $f$ allowing it to shoot forward and punch a hole in or otherwise mark the strip $d$.

Usually the strips would be in duplicate as indicated at $d$ and $d'$ (Fig. 1) and the rear strip $d'$ would by the action of a stamping device on opening the casing be stamped with the number of the meter or other identification mark. This may be effected by means of a rubber or other suitable stamp $f^2$ to which a piece of inking ribbon is attached in some suitable way, the said stamp being carried by or actuated by the punch $f$. The rear strip would be taken by the suppliers' agent and the front strip left with the consumer as a record of the quantity consumed and to be paid for. In meters with a prepayment attachment the punched strip would be equivalent to the consumer's receipt for value received.

In order to call attention to the approaching exhaustion of the record strip, the latter portion thereof may be colored red or the latter part of the scale printed in red, or otherwise distinguished.

The supply of gas may be arranged to be cut off by the automatic closure of a valve on the consumption of a predetermined quantity of gas. For this purpose the spindle $a$ is geared with a screw-threaded spindle $g$ on which is mounted a spur wheel $g'$ in mesh with a long pinion $h$ ranged parallel with the spindle $g$. The rotation of the spindle $g$ consequent on the consumption of gas traverses the wheel $g'$, which is guided by the teeth of the pinion $h$ to move axially along its spindle until it encounters and displaces one arm $i$ of a bell crank lever, the other arm $i'$ of which is connected with the spindle $j$ of the cut-off valve which is normally held open by a spring $j'$. A detent pin $k$ carried by the bell crank lever engages a notch $k'$ as shown in the drawings in a disk $k^2$ secured to the axle $h'$ of the pinion $h$, to prevent rotation of the pinion while the valve is open. The action of closing the valve also disengages the detent and allows the pinion $h$ and consequently the gear wheel $g'$ to be rotated by means of a suitable key applied to the pinion spindle, thus enabling the wheel $g'$ to be set to any desired position on the spindle $g$, such position determining the quantity of gas which may pass through the meter before the cut-off valve is automatically closed. It is obvious that this quantity should not exceed that represented by the unexhausted portion of the strip $d$, otherwise the meter will be stopped and the supply consequently cut off before the quantity corresponding to the position to which the gear wheel $g'$ is set has been consumed. The wheel $g'$ may carry a pointer $l$ which is arranged to traverse a scale of quantities $l'$ to facilitate the setting of the mechanism to cut off on the consumption of any predetermined quantity.

The setting mechanism may be arranged to be actuated by any suitable coin-freed prepayment mechanism such as indicated in Fig. 3 in which the pinion $h$ is actuated to set the gear wheel $g'$ by means of the train of gear $m\ m'$ which can be operated by the handle $n$ outside the meter casing in the known manner on the insertion of a coin or coins in the coin slot $o$.

In order to prevent the insertion of coins exceeding in value the value represented by the unexhausted portion of the strip $d$, the total capacity of the coin till may be limited to correspond with the total value represented by the strip.

For the purpose of adjustment, the winding drum $b$ is preferably loose on the spindle $b'$ and is connected with a graduated disk fast on the spindle by any suitable means, such as the pin and hole connection shown in the drawings, so as to be adjustable angularly with respect to the spindle. This adjustment enables the paper strip scale to be set in agreement with the scale $l'$ of the setting mechanism. The paper scale is arranged to pass in rear of an index $p$ which can be viewed through an inspection window $p'$ in the casing so that the consumer may at all times ascertain the quantity consumed up to date.

Although in the preceding description the improved apparatus has been described with reference to a gas meter, it will be understood that it may be applied to electric or other meters which have as part of their integrating mechanism a rotating spindle, the cut-off valve being replaced in an electric meter by a suitable switch.

Having thus described the nature of this invention and the best means we know of carrying the same into practical effect, we claim:

1. In gas meters or the like apparatus, the combination of a record strip driven from the meter mechanism and bearing a scale of numerics adapted to represent quantities of the consumption, with a record marking device automatically operative on the opening of the meter casing to mark the particular numeric corresponding with and indicating the quantity consumed since the insertion of the strip.

2. In gas meters or the like apparatus, the combination of a pair of similar record strips driven from the meter mechanism with a marking device operative on opening the meter casing to mark the scale of both strips according to the consumption and make an additional identification mark on one of the said strips.

3. In gas meters or the like apparatus, a pair of record strips driven from the meter mechanism and bearing similar scales representing the consumption, means automatically operative on opening the meter casing for marking the said strips, and means for simultaneously making an identification mark on one of the said strips, substantially as described.

In testimony whereof we have signed our names to this specification in the presence of two subscribing witnesses.

JOHN GUNNING.
JOHN HANSFORD.

Witnesses to the signature of John Gunning:
  WALTER I. SKERTEN,
  G. F. WARREN.

Witnesses to the signature of John Hansford:
  FRANCIS MORRIS MOWLAM.
  GUS. P. SYMES.